UNITED STATES PATENT OFFICE.

ALFONS SPITZER, OF BUDA-PESTH, ASSIGNOR TO WILHELM KRALIK SOHN, OF ELEONORONHAIN, AUSTRIA-HUNGARY.

MAKING ROSE-RED GLASS.

SPECIFICATION forming part of Letters Patent No. 518,336, dated April 17, 1894.

Application filed October 7, 1893. Serial No. 487,427. (No specimens.)

*To all whom it may concern:*

Be it known that I, ALFONS SPITZER, doctor of philosophy, a subject of the Emperor of Austria-Hungary, residing at Buda-Pesth, in the Province of Hungary, in the Empire of Austria-Hungary, have invented certain new and useful Improvements in Making Rose-Red Glass; and I do hereby declare the following to be a full, clear, and exact description of the invention, such as will enable others skilled in the art to which it appertains to make and use the same.

This invention relates to the process, discovered in 1865 by the French chemist J. T. Pelouze, of staining glass in rose-red by the incorporation into the ordinary glass-composition of free or so-called metallic selenium. In carrying out this process, the selenium is either added to the mixture of raw materials to be filled into the melting pot, or it is introduced into the already molten mass. There are two grave objections to this process, namely, a great part of the costly selenium becomes vaporized and burned under the action of the high temperature prevailing in the glass-melting-furnace, and the selenium of commerce is always accompanied by impurities such as copper, iron, &c., which interfere with the color of the glass and cannot be separated from the selenium except by a tedious process. According to my invention, these objections are overcome by adding either to the batch or to the molten glass composition consisting of silica potash and lime suitable selenites or selenates instead of metallic or free selenium and by decomposing these salts by the introduction of a convenient agent after they have been completely dissolved in the molten mass. This agent may be arsenious acid, arsenite of soda, zinc-dust, or other materials having similar effect, but in general arsenious acid is preferred. When selenite of soda $Na_2SeO_3$ and arsenious acid $As_2O_3$ are used two reactions take place. By the high temperature prevailing in the kiln oxygen is expelled from the $Na_2SeO_3$ and the selenide of sodium $Na_2Se$ thus formed is, in presence of arsenious acid decomposed according to the following equation:

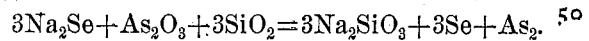

The selenite of soda, $Na_2SeO_3$, is also decomposed by the silicic acid $SiO_2$ and the selenious acid freed thereby is deprived of its oxygen by the arsenious acid, which takes place according to the following equations:

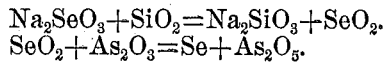

It is obvious however that the said salts and separating agents may be introduced together. I thus replace the easily inflammable metallic selenium by substances, which are very steady under high temperatures, and in preparing the selenites or selenates of the selenium of commerce, the impurities are necessarily at the same time eliminated. Consequently a better result is obtained at less expense.

In practice I find it preferable to use the selenites or selenates of alkalies or alkaline earths; it is obvious, however, that other salts of selenious or selenic acid may be used provided that the bases of these salts do not give a wrong color to the glass. The selenites or selenates chosen, which in most cases will be the potassic, sodaic or calcic salts, are either mixed with the batch or added to the molten glass mass, and in both cases the molten mass is well stirred up in order to obtain a uniform distribution therein of the dissolved salt or salts. The separating agent may be arsenious acid, arsenite of soda or potash, sulphite of soda, &c., but in general zinc-dust is preferred. The reducing agent is either mixed with the selenite or selenate or introduced separately, and in both cases the mass is stirred up after the addition. The selenium separated in this way gives the desired rose-red color to the glass.

The quantity of selenites or selenates to be added to the glass composition or to the molten glass depends on the desired depth of color to be given to the glass, and is best found out by a preliminary experiment on a small scale. In most cases two or three parts by weight of the selenites or selenates will suffice for thousand parts by weight of glass.

Having fully described my invention, what I claim, and desire to secure by Letters Patent, is—

1. The process of staining glass in rose-red, which consists in adding selenites or selenates and zinc-dust or equivalent agent to the glass batch or to the molten glass mass without further addition, substantially as described.

2. The process of staining glass in rose-red, which consists in adding potassic, sodaic or calcic selenites or selenates and zinc-dust to the glass batch or to the molten glass mass, substantially as described.

3. A new composition of matter for making rose red glass consisting of silica, potash, lime, a selenite or selenate of an alkali or alkaline earth and a suitable separating agent for the selenite or selenate substantially as set forth.

4. The herein described composition of matter for making rose red glass consisting of silica, potash, lime, selenite of soda and zinc dust or an equivalent separating agent, substantially as set forth.

In testimony whereof I affix my signature in presence of two witnesses.

ALFONS SPITZER.

Witnesses:
ARNOLD GEIRRING,
EMIL REISER.